(12) United States Patent
O'Brian

(10) Patent No.: US 6,698,817 B1
(45) Date of Patent: Mar. 2, 2004

(54) VARIABLE RATE COVERING SYSTEM FOR OPEN TOP VEHICLE CONTAINERS

(76) Inventor: Woody V. O'Brian, 3416 Queen's Ferry Dr., Wilson, NC (US) 27893

( * ) Notice: Subject to any disclaimer, the term of this patent is extended or adjusted under 35 U.S.C. 154(b) by 0 days.

(21) Appl. No.: 10/134,006

(22) Filed: Apr. 29, 2002

(51) Int. Cl.[7] .............................. B60J 11/00; F15B 15/22
(52) U.S. Cl. ............................... 296/98; 91/396; 91/405
(58) Field of Search ................................ 296/98; 91/396, 91/405

(56) References Cited

U.S. PATENT DOCUMENTS

| | | | | |
|---|---|---|---|---|
| 2,882,869 A | * | 4/1959 | Krapf | |
| 2,931,218 A | * | 4/1960 | Ottestad | |
| 2,935,047 A | * | 5/1960 | Ortman et al. | |
| 3,023,739 A | * | 3/1962 | Dickson, Jr. et al. | |
| 3,267,815 A | * | 8/1966 | Otrman et al. | |
| 3,370,428 A | * | 2/1968 | Van Deberg | |
| 3,388,634 A | * | 6/1968 | Madland | |
| 3,964,370 A | * | 6/1976 | Rich | 91/396 |
| 3,974,910 A | * | 8/1976 | Papai | 91/396 |
| 4,050,734 A | * | 9/1977 | Richard | 296/98 |
| 4,167,134 A | * | 9/1979 | Yuda | 91/405 |
| 4,181,066 A | * | 1/1980 | Kitchen et al. | 91/405 |
| 4,296,675 A | * | 10/1981 | Gies | 91/396 |
| 4,341,416 A | * | 7/1982 | Richard | 296/98 |
| 4,425,836 A | * | 1/1984 | Pickrell | 91/405 |
| 4,874,196 A | * | 10/1989 | Goldstein et al. | 296/98 |
| 4,981,317 A | * | 1/1991 | Acosta | 296/98 |
| 5,292,169 A | * | 3/1994 | O'Brian | 296/98 |
| 5,752,735 A | * | 5/1998 | Fleming et al. | 296/98 |
| 5,803,528 A | * | 9/1998 | Haddad, Jr. | 296/98 |
| 6,237,985 B1 | * | 5/2001 | O'Brian | 296/98 |
| 6,464,283 B2 | * | 10/2002 | Haddad, Jr. | 296/98 |
| 6,578,897 B2 | * | 6/2003 | White | 296/98 |
| 2002/0014780 A1 | * | 2/2002 | Searfoss | 296/98 |

* cited by examiner

Primary Examiner—D. Glenn Dayoan
Assistant Examiner—H. Gutman
(74) Attorney, Agent, or Firm—Mills Law Firm PLLC

(57) ABSTRACT

A variable rate covering system for open top vehicle containers includes a hydraulic actuating system for pivoting arms carrying a roll up cover wherein the fluid flow rates to the hydraulic cylinders are reduced during the initial and final phases of the stroke to reduce acceleration and impact forces on the arms, cover and components, and normal fluid flow rates are provided during central phase movement without significantly affecting overall cycle time. The hydraulic cylinders are provided with metering orifices that reduce fluid flow rates to and from the cylinder pressure chambers for predetermined portions of the stroke length, thereby cushioning the pivoting mechanism at the terminal positions.

4 Claims, 5 Drawing Sheets

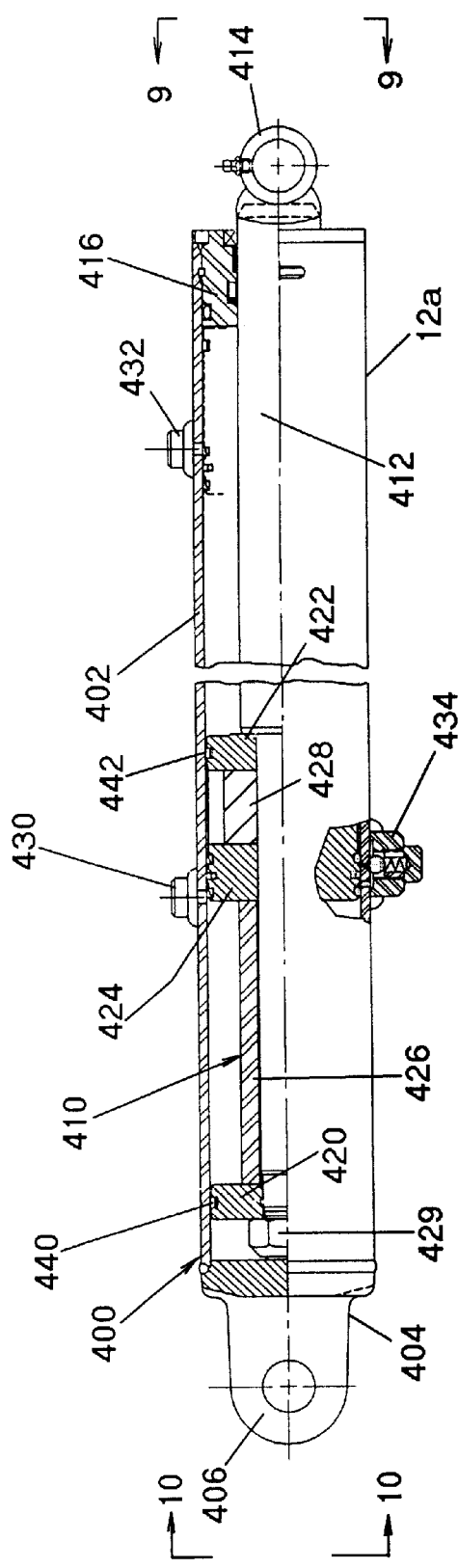
FIG. 8
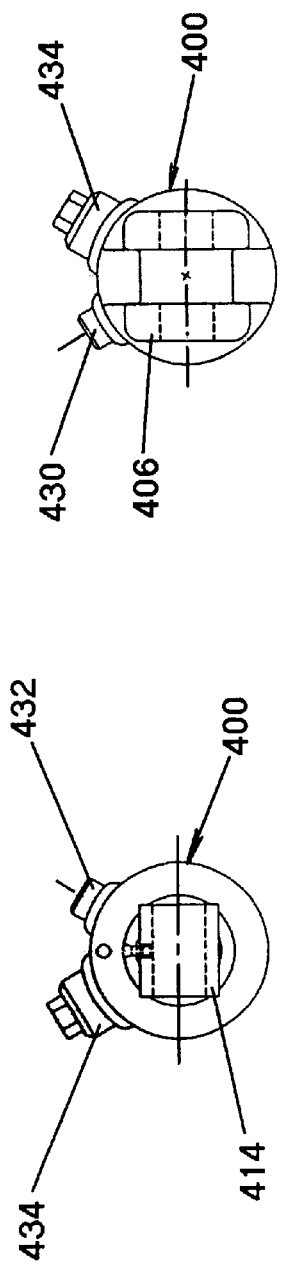
FIG. 10
FIG. 9

VARIABLE RATE COVERING SYSTEM FOR OPEN TOP VEHICLE CONTAINERS

FIELD OF THE INVENTION

The present invention relates to apparatus for covering open top vehicle containers, and, in particular, a hydraulically operated pivoting arm covering system having variable rate actuation.

BACKGROUND OF THE INVENTION

Governmental regulations require many open vehicle containers carrying particulate and waste cargos to limit spillage during transport. Various mechanical, electrical and hydraulic systems have been proposed for covering the load after filling, and uncovering the load at the discharge site. Hydraulic systems have become preferred for larger containers and vehicles carrying a variety of container sizes.

Typical hydraulic systems, as disclosed in U.S. Pat. Nos. 4,050,734 and 4,341,416 to Richard, and 4,981,317 to Acosta, employ a pair of pivoting arms that unroll a covering tarp over the container top in movement between an open and closed position. The arms are actuated by a hydraulic cylinders controlled by the operator at the side of the vehicle. For long bed containers or vehicles hauling containers of varying sizes, secondary sets of cylinder actuated extendable linkages are employed as shown representatively in U.S. Pat. Nos. 4,874,196 to Horvath; and Re. 36,135 and 6,237,985 to O'Brian.

The hydraulic tarp systems are generally controlled by hydraulic control systems located at the front side of the container behind the vehicle cab. Using two-way valve controls for single actuator sets, or joystick controls for multiple actuator sets, the operator furls or unfurls the cover while maintaining visual contact with its deployment. To minimize deployment time, faster covering rates are preferred by the drivers and the trucking organization. Such speed, however, comes at substantial maintenance costs. The rapid acceleration from the rest condition stresses the cover, the spooling mechanism, and the pivoting arms, and can cause damage to components and misalignments in the system. The impact and sudden deceleration at the end of the cylinder stroke pose similar problems. While slow cylinder rates have been used, the excessive time penalty involved has not been accepted, and accordingly time considerations have prevailed over maintenance preferences.

In view of the foregoing, it would-be desirable to provide a container covering system that would reduce maintenance costs while providing acceptable deployment cycles.

Accordingly it is an object of the present invention to provide a roll-up cover assembly for truck containers that reduces maintenance costs.

Another object of the invention is to provide a hydraulic actuator system for truck container covering apparatus that reduces component damage at the ends of the actuator stroke.

A further object of the invention is to provide a hydraulic actuator for a truck container covering system having reduced initial and terminal actuator rates for reducing equipment damage without significantly reducing overall deployment time.

Yet another object of the invention is to provide a variable rate covering system for open top containers providing controlled extension and retraction rates form open and closed positions.

SUMMARY OF THE INVENTION

The foregoing objects are accomplished by a hydraulic actuating system for a pivoting arm container covering system wherein the fluid flow rates to the hydraulic cylinders are reduced during the initial and final phases of the stroke to reduce acceleration and impact forces on the covering system components, and normal fluid flow rates are provided during the central phase, whereby the overall cycle time is not significantly affected. Therein, the hydraulic cylinders are provided with metering orifices that reduce fluid flow rates to and from the cylinder pressure chambers for predetermined portions of the stroke length, thereby cushioning the pivoting mechanism at the terminal positions.

DESCRIPTION OF THE DRAWINGS

The above and other objects and advantages of the present invention will become apparent upon reading the following detailed description taken in conjunction with the accompanying drawings in which:

FIG. 8 is a partially sectioned side view of a variable rate hydraulic cylinder for the cover systems;

FIG. 9 is an end view of the cylinder taken along line 9—9 of FIG. 8;

FIG. 10 is an end view of the cylinder taken along line 10—10 of FIG. 8;

DETAILED DESCRIPTION OF THE PREFERRED EMBODIMENTS

Figure 1:
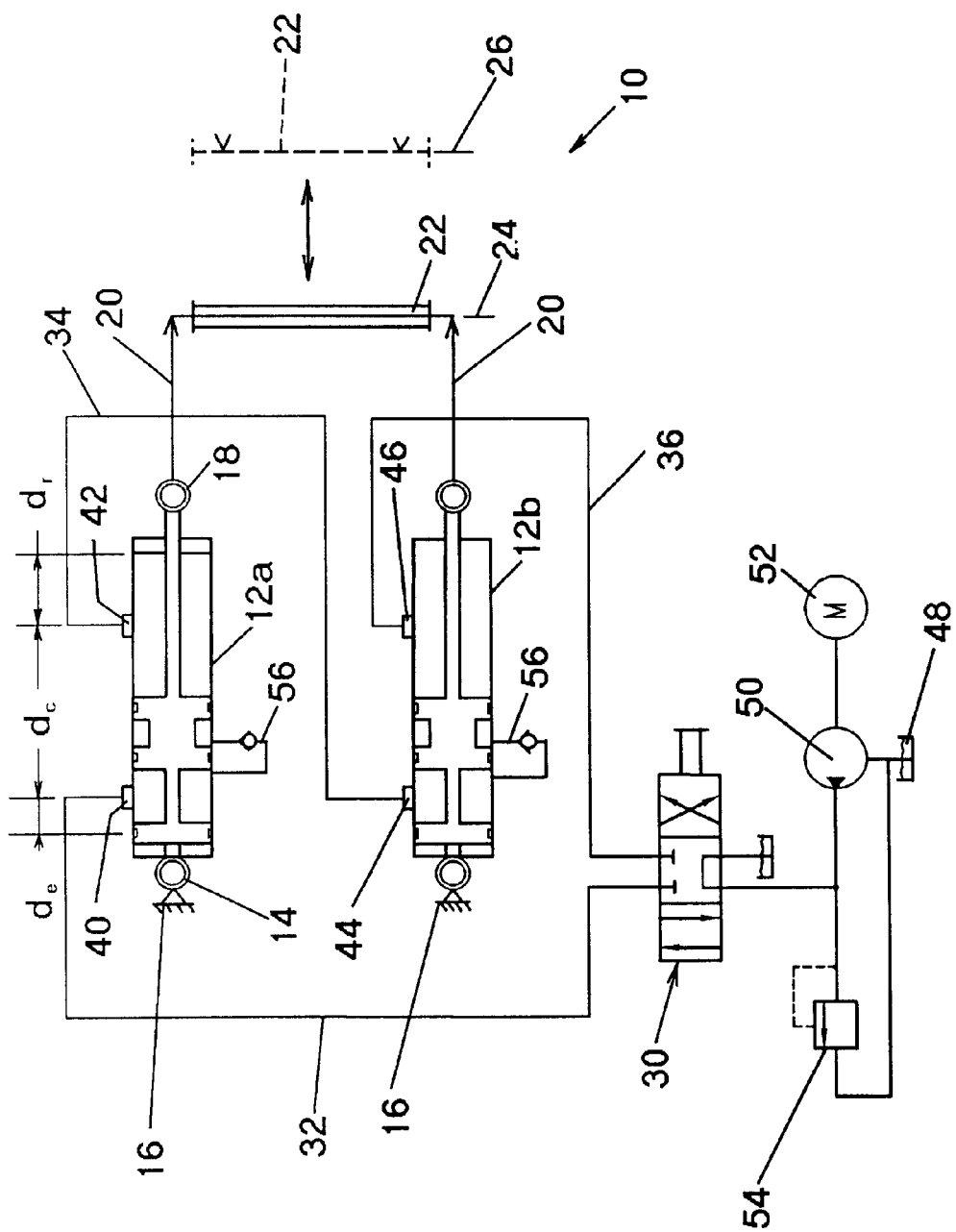
FIG. 1 is a schematic drawing of a variable rate covering system in accordance with an embodiment of the invention.

Referring to the drawings for the purpose of describing the preferred embodiment and not for limiting same, FIG. 1 schematically illustrates a variable rate covering system 10 for open top containers generally of the types shown in FIGS. 2 through 7. The system 10 includes a pair of variable rate hydraulic cylinders 12*a* and 12*b* attached at a base end 14 to brackets 16 carried on opposed sides of the container and attached at a head end 18 to base arms 20, which pivot in response to cylinder extension and retraction to move a cover spool 22 between an unfurled open position 24 permitting loading and unloading of an open top container, and a furled closed position 26 enclosing the open top of the container to assist in retaining the container contents.

In the preferred embodiment, the cylinders 12a and 12b are connected in phased relationship from two-way valve 30 by fluid supply lines 32, 34, and 36. Supply line 32 is connected from valve 30 to extension port 40 on cylinder 12a. Supply line 34 is connected between retraction port 42 on cylinder 12a and extension port 44 on the lower on cylinder 12b. Supply line 36 is connected between retraction port 46 on cylinder 12b and valve 30. Fluid is supplied from reservoir 48 by a hydraulic pump 50 operated by motor 52. A relief valve 54 routes fluid to the reservoir 48 under excessive pressure conditions. The cylinders 12a and 12b are maintained in phase relationship by rephase bypass circuits 56. As described in greater detail below, the cylinders are provided with a piston assembly having a first metering rings on opposite ends and a central seal assembly.

In response to valve 30 actuation, the cylinders provide a variable rate stoke comprising a reduced rate for a distance $d_e$ between the left metering ring and the central seal assembly, a reduced rate for distance $d_r$ between the central seal assembly and the right metering ring, and operational rate for remaining stroke distance $d_c$.

Figure 2:
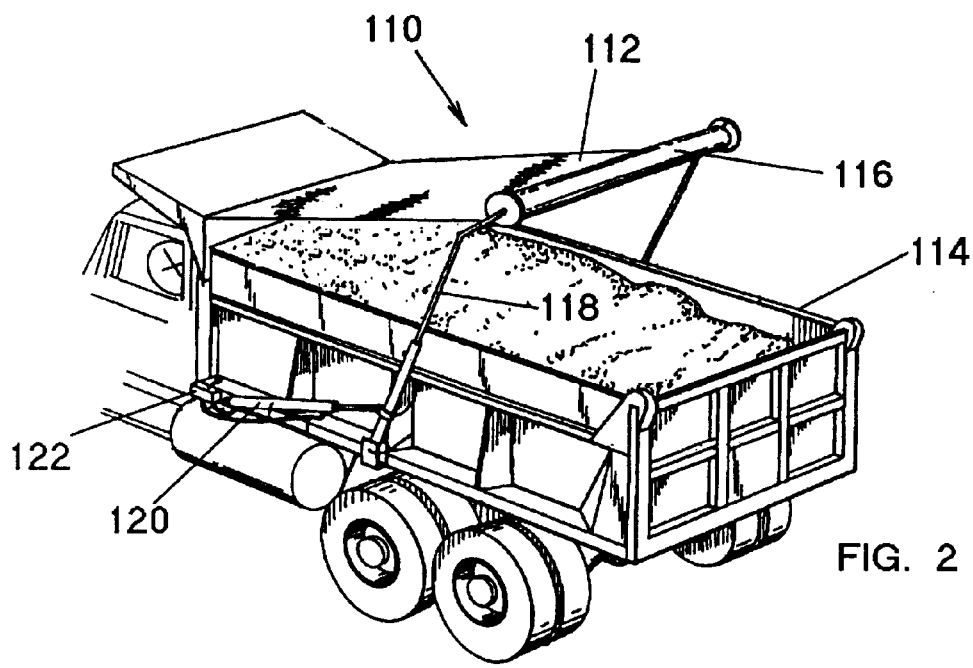
FIG. 2 is a partial perspective view of a fixed arm covering system illustrating the cover in an intermediate position over an open top container.
Figure 3:
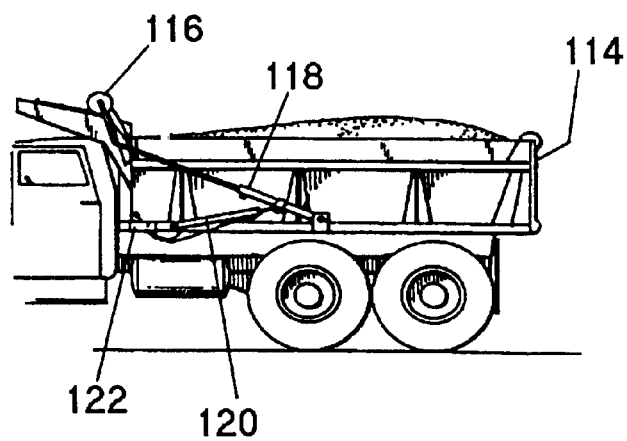
FIG. 3 is a partial side view of the cover of FIG. 2 in the retracted position.
Figure 4:
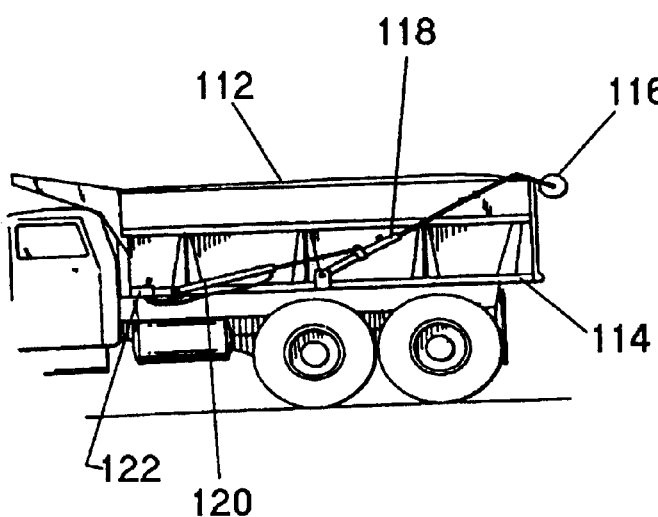
FIG. 4 is a view similar to FIG. 3 of the cover in the extended position.
Figure 5:
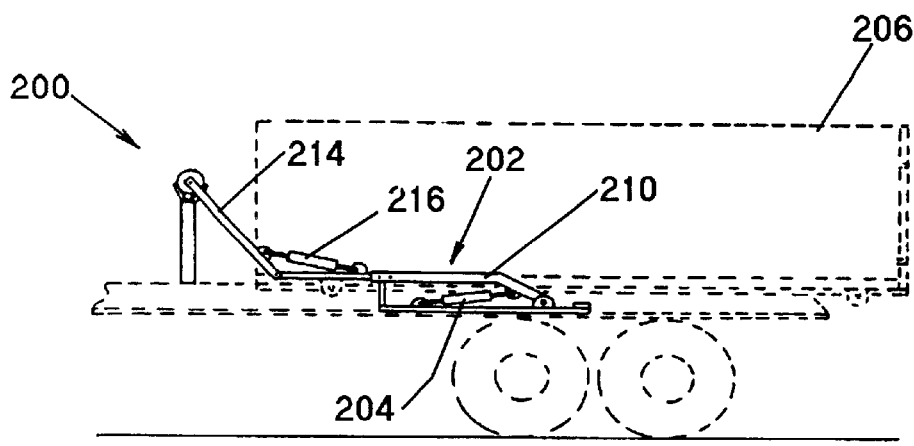
FIG. 5 is a partial side view of an articulated arm cover system illustrating the cover in the retracted position.
Figure 6:
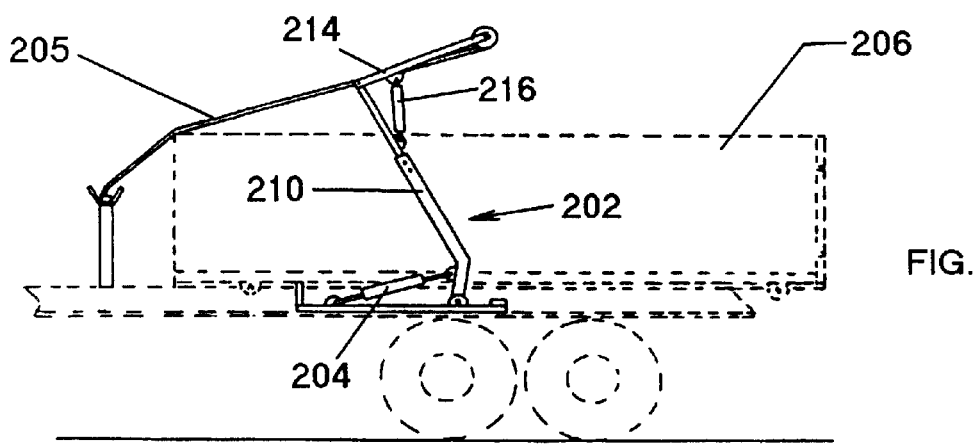
FIG. 6 is a view similar to FIG. 5 illustrating the cover in an intermediate position.
Figure 7:
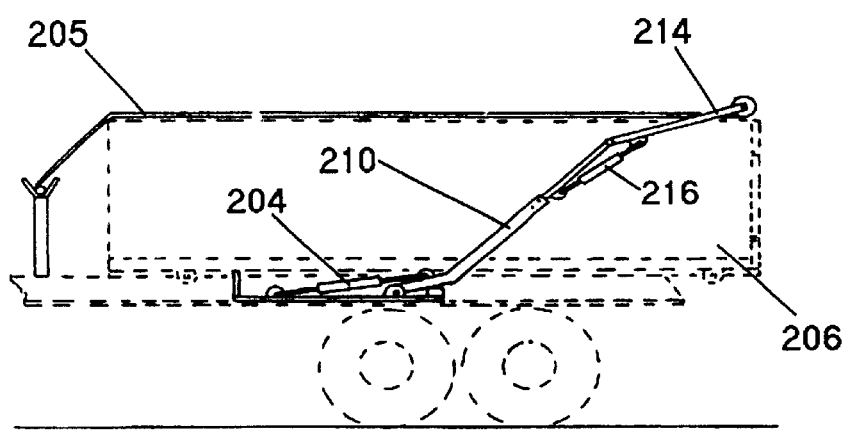
FIG. 7 is a view similar to FIG. 5 illustrating the cover in the extended position.

The system as above described may be incorporated into various covering systems, including without limitation a fixed arm system of the type shown in FIGS. 2 through 4, or the articulated arm system shown in FIGS. 5 through 7. The system may also be used in covering systems employing other supplemental linkages, such as telescoping outer arms. The cylinders as described above have primary reference to use in conjunction with the lower base arms in such systems and will be hereinafter described with reference thereto.

Referring to FIGS. 2 through 4, a fixed arm covering system 110 is used to deploy a cover 112 over an open top container 114. The cover 112 is mounted on a roll up spool 116 attached at the outer ends of pivoting arms 118 for movement between a retracted position shown in FIG. 3 wherein the cover 112 is furled, through an intermediate position shown in FIG. 2, to an extended position wherein the cover is unfurled and encloses the top end of the container 114. Movement of the arms 118 is effected by hydraulic cylinders 120, in accordance with the invention, and operator controlled by lever valve assembly 122 disposed at the front driver side of the container. During movement to and from the retracted position of FIG. 3, the cylinders operate at a reduced rate. During movement to and from the extended position of FIG. 4, the cylinders also operate at a reduced rate. During the intermediate stage shown in FIG. 2, the cylinders operate at a normal rate dependent on conventional operating conditions.

For the articulated cover system 200 shown in FIGS. 5 through 7, an arm assembly 202 is pivoted by base cylinders 204 to move a cover 205 over the open upper end of a vehicle mounted container 206. The arm assembly 202 includes a base arm 210 operated by variable rate hydraulic cylinder 204 in accordance with the invention. An upper secondary arm 214 is attached at the upper end of base arm 210 and operated by secondary hydraulic cylinder 216. Depending on preference, a multiple rate stroke may be provided by the cylinders 216. The cover system 200 is moved by cojoint actuation from the cylinders 204 and 216 from the retracted position shown in FIG. 5 at a reduced rate, cojointly by cylinders 204 and 216 during an intermediate distance shown in FIG. 6, and to the extended position shown in FIG. 7 enclosing the top of the container.

Referring to FIGS. 8 through 10, the cylinder 12a, by way of example, for the system described above comprises tube assembly 400 including a cylinder tube 402 carrying a sealed tail 404 having an end ring 406 for mounting on the vehicle at appropriate brackets. A piston assembly 410 including a piston rod 412 is slidably carried in the bore of the tube 402. The piston rod 412 outwardly terminates with an apertured ring 414 for connection to the pivoting arm of the applicable cover system. The piston rod 412 of the tube assembly 400 is conventionally sealed by packing gland lot 416. The piston assembly 410 includes a tail metering section 420, a head metering section 422, and a center sealing section 424, axially separated by annular spacer sleeves 426, 428, all of which are carried by the end portion of the piston rod 412 and operatively connected therewith by threaded fastener 429. Radially extending extension fluid port 430 and retraction fluid port 432 are positioned along the tube 402. A radially extending rephase port assembly 434 is positioned on the tube 402 intermediate the ports 430 and 432. The piston sections 420, 422, and 424 have a sliding fit with the inner bore of the tube 402. The tail metering section 420 includes a circumferential groove carrying a metering ring 440. The head metering section 422 includes a circumferential groove carrying a metering ring 442.

Figure 11:
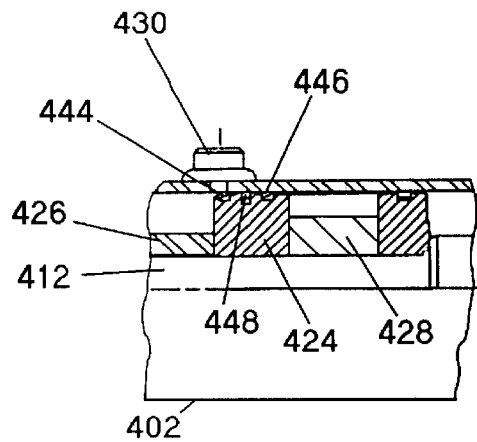
FIG. 11 is a fragmentary partially sectioned cross sectional view of the hydraulic cylinder showing the piston in the retracted position.
Figure 12:
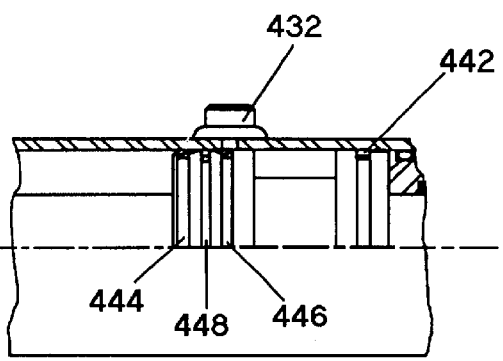
FIG. 12 is a fragmentary partially sectioned cross sectional view of the hydraulic cylinder showing the piston in the extended position.

Referring to FIGS. 11 and 12, the center sealing section 424 includes a zero leakage sealing assembly including an axially spaced series of circumferential grooves carrying a pair of axially spaced, zero leakage bearing rings 444, 446 and an intermediate low friction sealing ring 448. The spacer sleeves 426 and 428 have a reduced diameter establishing annular fluid chambers between the adjacent piston sections. The spacer sleeves have a length for establishing the requisite distance between the adjacent fluid port and the adjacent metering rings for establishing the lengths of the reduced flow rate distances, $d_e$ and $d_r$ as shown in FIG. 1. The extension fluid port 430 includes a radial passage partially obstructed by the bearing ring 444 in the retracted position. The retraction fluid port 432 includes a radial passage partially obstructed by the bearing ring 446 in the extended position as shown in FIG. 12.

Figure 13:
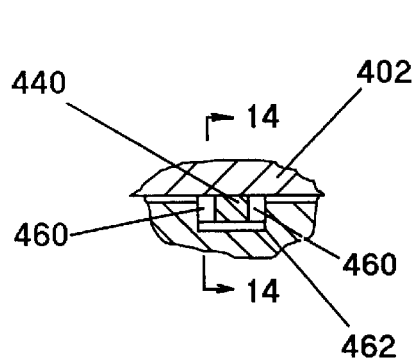
FIG. 13 is a fragmentary radial sectional view of the metering ring.
Figure 14:
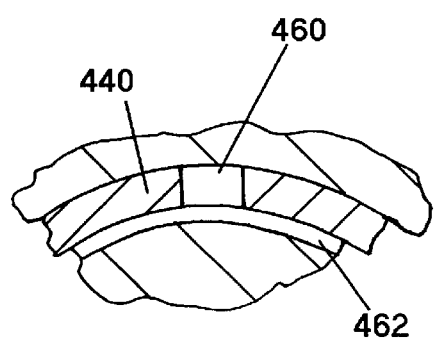
FIG. 14 is a fragmentary axial sectional view taken along line 14—14 in FIG. 13.

Referring to FIGS. 13 and 14, the metering ring 440 and metering ring 442 are provided with radial slots 460 in the axial end faces and are retained in outwardly opening circumferential grooves 462. The metering rings have a larger diameter than the base of the groove 462 thereby establishing a flow path between opposed slots. By controlling number, width and depth of the slots, a controlled leakage is established past the metering rings in fluid path between the port and the respective pressure chamber. In a well know manner, the rephase port assembly vents on either side of the seal assembly to allow both pistons to reach a terminal aligned position at the end of each retraction cycle thereby maintaining synchronous aligned movement of the pivoting arms and even deployment of the container cover.

In operation, at the commencement of an extension cycle as conditioned by the two-way control valve 30, the line 32 is pressurized. Initially the flow rate through the extension port is throttled by the bearing ring 444 to limit in a first instance the extension rate. After the extension port is fully open, the flow pressurizes the annular chambers between the piston sections. Flow to the extension pressure chamber is restricted by the metering ring 440 thereby in a second instance providing a second extension rate, which continues until the metering ring passes beyond the extension fluid port 430. Thereafter, non-restricted flow is applied to the extension pressure chamber effecting a fill extension rate based on system conditions for a center part of the piston stroke. During the center extension stroke, non-restricted fluid flow exits through retraction fluid port 432. When the head metering section is adjacent the retraction port, the metering ring 442 begins to throttle the exiting fluid flow, thus reducing the extension rate and slowing the pivoting of the arms. As the piston approaches the fully extended position, the retraction port is partially obstructed by the bearing ring 446, further restricting the exit flow and consequently the terminal extension rate. At the end of the strokes, over pressure conditions resulting from continued valve opening are regulated by the relief valve, 54, (FIG. 1).

For the retraction stroke, the reverse conditions apply. The metering ring 442 throttles extension to provide a reduced retraction rate until the metering rings pass the retraction port 432, at which time a full retraction rate is provided, until the rear metering ring 440 passes the extension fluid port 430, restricting the exit flow and reducing the retraction rate until the piston is seated at the end of the stroke.

Accordingly, it will be appreciated that variable rate cylinders provide reduced acceleration and deceleration conditions at the ends of the piston stroke to lessen loading and impact forces on the cover components at the terminal moments in the open and closed conditions, thereby reducing maintenance cost and extending the operating life of the system. Because of the cushioning features that allow safe seating and removal from the stop positions, a higher flow rate can be used during the center movement thereby increasing the pivoting speed of the arm assemblies and offsetting any increased times occasioned by the slower end rates. Further, the length of the space sleeves may be adjusted to provide ample slow rate motion to allow the operator to safely guide the cover to the stop positions. In many configurations, alignment at the front end of the container is more difficult, particularly in articulated arm designs where various truck and container surfaces must be avoided. Accordingly, it may be preferable to provide an increased slow rate zone during this portion of the traverse. At the rear end of the container, the stowing is more straightforward and a lesser cushioning zone may be sufficient.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. In combination with a vehicle having an open top container, a variable rate covering system comprising: a pair of arms pivotally supported on the vehicle for movement between a first position and a second position; a rolling cover member connected between the vehicle and said arms, said cover member being disposed in a stowed condition in said first position exposing the open top of the container and in an extended condition in said second position covering the open top of the container; a hydraulic cylinder including a piston member operatively connected between said vehicle and each of said arms; and a fluid control assembly for delivering fluid to actuating chambers in said cylinders at opposed ends of said piston member for effecting an actuating stroke between an extended position and a retracted position and thereby moving said arms between said first position and said second position, first and second metering ring members carried in outer grooves on opposite ends of said piston member, each of said metering ring members having a diametral clearance with said groove and including radial slots formed in opposed axial surfaces thereof, said slots and said grooves providing restricted flow paths past said metering ring members during terminal portions of the stroke; a first sealing member and a second sealing member carried on a center portion of the piston member; a first fluid port in said cylinder partially obstructed by said first sealing member in said first position and a second fluid port in said cylinder partially obstructed by said second sealing member in said second position for restricting the flow rates to said actuating chambers during initial movement of said piston member between said extended and retracted positions.

2. A variable rate covering system for an open top of a container carried on a vehicle, said system comprising: a pair of elongate arms pivotally mounted on opposite sides of the vehicle; a pair of fluid actuators, each actuator including a cylinder operatively connected at one end to said vehicle and carrying a piston assembly operatively connected to one of said elongate arms, said piston assembly axially moveable in said cylinder between a first position adjacent a first end wall of said cylinder and a second position adjacent a second end wall of said cylinder, said piston assembly in movement between said first position and said second position providing an actuating stroke for moving said elongate arms between a retracted position adjacent one end of said container and an extended position adjacent the other end of said container; a roller member carrying a cover sheet for overlying said open top of said container, said cover sheet being furled on said roller member in said retracted position and being unfurled and overlying said open top in said extended position; first and second fluid ports on each of said cylinders intermediate said end walls thereof; a sealing assembly carried by said piston assembly and sealingly engaging said cylinder between said ports; a first metering ring carried in a first annular groove in said piston assembly located between one of said fluid ports and said first end wall of said cylinder when said piston assembly is in said first position; a second metering ring carried in a second annular groove in said piston assembly located between the other of said fluid ports and said second end wall of said cylinder when said piston assembly is in said second position, said metering rings and said grooves configured and interrelated to provide a restriction to the flow of fluid to an adjacent end of said piston assembly until one of said metering rings is located between said fluid ports; and fluid control means for selectively routing a pressurized fluid to said ports to effect said actuating stroke of said piston assembly whereby said metering rings reduce the actuation rate of said actuator stroke until said metering rings are intermediate said fluid ports.

3. The system as recited in claim 1 wherein each of said metering rings include radial slots on axially opposed sides thereof and have diametral clearance with the associated groove for providing a flow passage between piston assembly and said cylinder through said radial slots and said grooves.

4. The system as recited in claim 3 wherein said sealing assembly includes a sealing ring engaging the cylinder and partially obstructing one of said fluid ports in each of said first and second positions thereby additionally restricting the flow rate through said fluid ports for initial movement at said first position and said second position.

* * * * *